(12) United States Patent
Lee

(10) Patent No.: US 8,587,428 B2
(45) Date of Patent: Nov. 19, 2013

(54) SYSTEM FOR PROTECTING UNDERGROUND UTILITIES AND PREVENTING DAMAGES

(75) Inventor: Myeong Sik Lee, Daejeon (KR)

(73) Assignee: Hizen Co., Ltd., Daejeon (KR)

( * ) Notice: Subject to any disclaimer, the term of this patent is extended or adjusted under 35 U.S.C. 154(b) by 0 days.

(21) Appl. No.: 13/637,129

(22) PCT Filed: Nov. 19, 2010

(86) PCT No.: PCT/KR2010/008210
§ 371 (c)(1),
(2), (4) Date: Sep. 25, 2012

(87) PCT Pub. No.: WO2012/067290
PCT Pub. Date: May 24, 2012

(65) Prior Publication Data
US 2013/0015973 A1    Jan. 17, 2013

(51) Int. Cl.
*G08B 21/00* (2006.01)
*G08B 13/00* (2006.01)

(52) U.S. Cl.
USPC .......................... 340/540; 340/541; 340/565

(58) Field of Classification Search
USPC ......................................... 340/540, 541, 565
See application file for complete search history.

(56) References Cited

U.S. PATENT DOCUMENTS

| | | | | |
|---|---|---|---|---|
| 5,557,258 A | * | 9/1996 | Eslambolchi | 340/540 |
| 5,708,195 A | * | 1/1998 | Kurisu et al. | 73/40.5 R |
| 7,667,599 B2 | * | 2/2010 | Mainini et al. | 340/565 |
| 2004/0124264 A1 | * | 7/2004 | McLisky | 239/337 |

* cited by examiner

*Primary Examiner* — Brian Zimmerman
*Assistant Examiner* — Thomas McCormack
(74) *Attorney, Agent, or Firm* — Rabin & Berdo, P.C.

(57) ABSTRACT

The present invention relates to a system for protecting underground utilities and preventing damages which can be easily manufactured, carried, installed, and removed, and can minimize breakage of underground utilities and danger of an accident due to the breakage, by transmitting direct warning through light or sound in response to pressure applied over a predetermined level, or by transmitting a dangerous situation to an underground utilities management server.

8 Claims, 4 Drawing Sheets

SYSTEM FOR PROTECTING UNDERGROUND UTILITIES AND PREVENTING DAMAGES

BACKGROUND OF THE INVENTION

1. Field of the Invention

The present invention relates to a system for protecting underground utilities and preventing damages, and more particularly, a system for protecting underground utilities and preventing damages which can be easily manufactured, carried, installed, and removed, and can minimize breakage of underground utilities and danger of an accident due to the breakage, by transmitting direct warning through light or sound in response to pressure applied over a predetermined level, or by transmitting a dangerous situation to an underground utilities management server through wireless communication.

2. Description of the Related Art

Underground utilities, such as power transmission line pipes, gas pipes, water supply and drainage pipes, and oil pipes, is laid under the ground under multi-residential houses such as apartments or officetels, roads, and streets, for safety and esthetic appearance, and it is necessary to repair the underground utilities, which keeps laid under the ground for a long period of time, due to decrepitude corrosion by infiltration water, or installation of more utilities.

It is necessary to repair and replace the underground utilities after exposing the underground utilities to the outside by digging in the ground under with the underground utilities is laid, in order to repair and replace the underground utilities, as described above, in which general digging is easily and quickly performed by an excavator and the bucket of the excavator digs in the ground.

However, there is a problem in that since the operation of the excavator performs digging generally without knowing the location of the underground utilities, the bucket of the excavator excessively presses the underground utilities and breaks the utilities laid under the ground.

Alternatively, excavation may be performed for another purpose at the area where the underground utilities is installed. There is also a problem in this case in that the underground utilities is broken and loses its function, when the operator does not know whether the underground utilities is laid or the location of the underground utilities, in digging.

In order to solve the problems, a device for protecting underground utilities of the related art is implemented in the shape of a cover or a plate and installed above underground utilities to protect the underground utilities in digging, in which the bucket comes in contact with the cover or the plate to allow the operator to recognize whether there is utilities under the ground and the location of the underground utilities.

According to the device for protecting underground utilities of the related art, however, it is necessary to install a cover around the underground utilities or install a plate wider than the underground utilities, together with the underground utilities, such that it is difficult to carry the device due to the volume and it is necessary to make excavation for installing the underground utilities wider (to increase the construction area).

Further, since the protecting device of the related art protects the underground utilities while the cover or the plate resists impact due to the bucket, the cover or the plate is made of a high-strength material, generally metal, such that there is a problem in that it take a lot of time and cost to manufacture, carry, and install the cover or the plate, and to remove the cover or the plate in order to repair and maintain the underground, due to the weight.

Further, according to the protecting device of the related art, since the underground utilities is covered by the cover or the plate, it is necessary to remove the cover or the plate and check the underground utilities in order to check which kind of underground utilities is laid, and if the underground utilities is a pipe, it was impossible to know the use of the underground utilities even though checking the underground utilities. Therefore, there is a problem in that the worker has difficulty in know which kind of underground utilities is laid and cannot appropriately cope with danger of an accident that may occur when the underground utilities is damaged.

Further, when the worker operates a work without knowing whether there is underground utilities and the bucket of an excavator is approached to underground utilities, the underground utilities may be damaged, such that a manager of the underground utilities lets the workers at the construction site know that there is underground utilities, or goes to the construction site and supervises the construction, and accordingly, it is possible to prevent an accident and take appropriate measures when an accident occurs. However, the device for protecting underground utilities of the related art is not provided with a function of warning the manager of underground utilities of a dangerous situation, such that there is a problem in that it is difficult to take safety measures for excavation in an area that the manager cannot check.

Further, as the underground utilities, generally, a plurality of pipes are bound and laid under the ground, in which high-pressure gas or fluid may leak from the joints of the pipes. However, since the device for protecting underground utilities of the related art has a structure only for protecting underground utilities, there is a problem in that in spite of possibility of a large accident due to leakage of gas or fluid at the joints of the pipes, it is difficult to check the leakage and cope with the accident.

SUMMARY OF THE INVENTION

The present invention has been made in an effort to provide a system for protecting underground utilities and preventing damages, which is easily manufactured, carried, installed, and removed, by implementing a simple structure with a small volume.

Further, the present invention provides a system for protecting underground utilities and preventing damages, which can inform a worker of the kind of underground utilities, using light or sound in response to pressure applied over a predetermined level.

Further, the present invention provides a system for protecting underground utilities and preventing damages, which can transmit a dangerous situation to a management server of underground utilities through wireless communication.

Further, the present invention provides a system for protecting underground utilities and preventing damages, which can check whether gas or fluid leaks from underground pipes from a change in pressure, and cope with the leakage.

A system for protecting underground utilities and preventing damages according to an aspect of the present invention includes: a pressure sensing unit that is installed close to underground utilities and senses a pressure change; a control unit that is connected to the pressure sensing unit and generates an alarming instruction, when a pressure change sensed by the sensing unit is above a predetermined level; an alarming unit that is connected to the control unit, is exposed on the ground, and generates an alarming signal in accordance with the alarming instruction from the control unit; and a power unit that supplies power to the pressure sensing unit, the control unit, and the alarming unit.

The pressure sensing unit may include a gas pipe that is broken at a pressure over a predetermined level, a gas in the gas pipe, and a pressure switch that switches when the pressure of the gas is decreased by breakage of the gas pipe.

The gas may have a color such that whether the gas is ejected is seen to naked eyes.

The pressure sensing unit may be a piezoelectric sensor or a piezosensor that generates an electric signal in accordance with a change in pressure.

The alarming unit may generate an alarming signal, using light or sound, or may wirelessly transmit the alarming signal to an underground utilities management server.

The power unit may include a solar cell that is disposed to be exposed on the ground together with the alarming unit, and a capacitor that accumulate electricity generated by the solar cell.

According to a system for protecting underground utilities and preventing damages, as the pressure sensing unit having a simple configuration with a small volume, that is, which is implemented by a thin pipe or a cable, is installed at the predetermined distance above underground utilities to sense a change in pressure, it is possible to easily manufacture, carry, install, and remove the system, and accordingly, it is possible to reduce the time and cost for the works.

Further, according to the present invention, it is possible to let a worker to know the kind of underground utilities by generating light or sound in response to pressure applied over a predetermined level, such that the worker can appropriately cope with danger of an accident that may occur when the underground utilities is broken.

Further, even if the alarming unit fails to normally operate, the underground utilities can be protected, because the gas having a color, which can be seen to the naked eyes through the pressure sensing unit, is ejected. Further, when the pressure sensing unit senses pressure by using a high-pressure gas, the alarming unit sounds an alarm in response to leakage of gas without external impact, such that pressure sensing unit can keep the normal operation state. Therefore, according to the present invention, as the pressure sensing unit and the alarming unit operate to complement each other, the system according to the present invention can stably operate.

Further, according to the present invention, it is possible to transmit a dangerous situation to the underground utilities management server through wireless communication, such that it is possible to quickly take safety measures in real time against excavation.

Further, according to the present invention, it is possible to check whether gas or liquid leaks from the underground utilities, from a change in pressures, and to cope with leakage, such that it is possible to preclude a large accident due to leakage of gas or fluid.

DETAILED DESCRIPTION OF THE PREFERRED EMBODIMENTS

A system for protecting underground utilities and preventing damages according to an exemplary embodiment of the present invention will be described hereafter with reference to the accompanying drawings.

First Exemplary Embodiment

Figure 1:
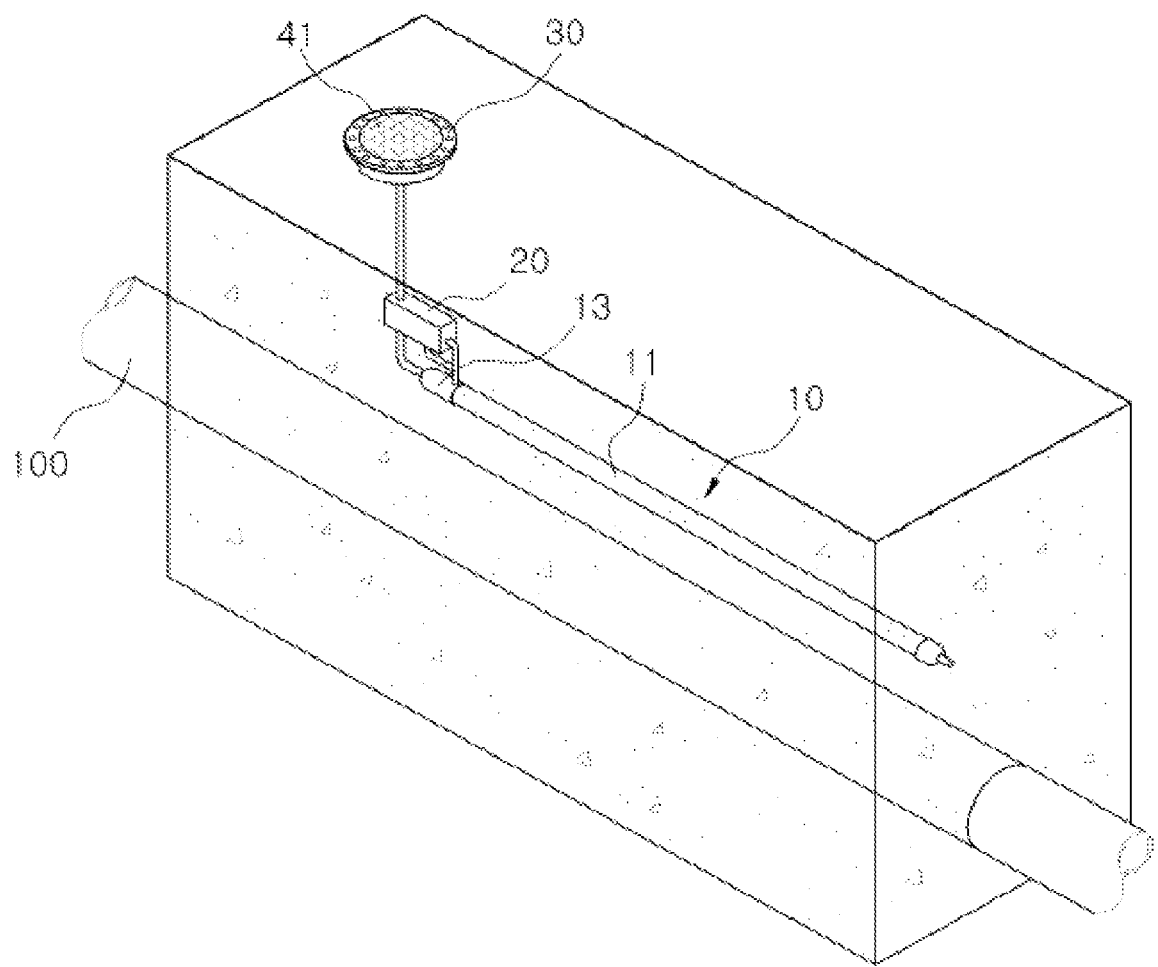
FIG. 1 is a perspective view of a system for protecting underground utilities and preventing damages according to a first exemplary embodiment of the present invention.
Figure 2:
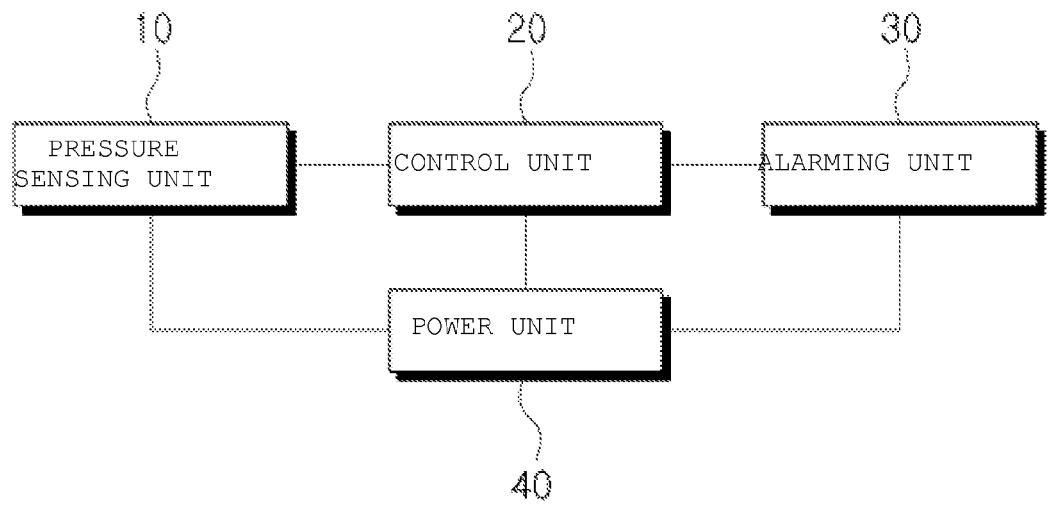
FIG. 2 is a diagram illustrating the configuration of an electrical connection relationship according to the first exemplary embodiment.
Figure 3:
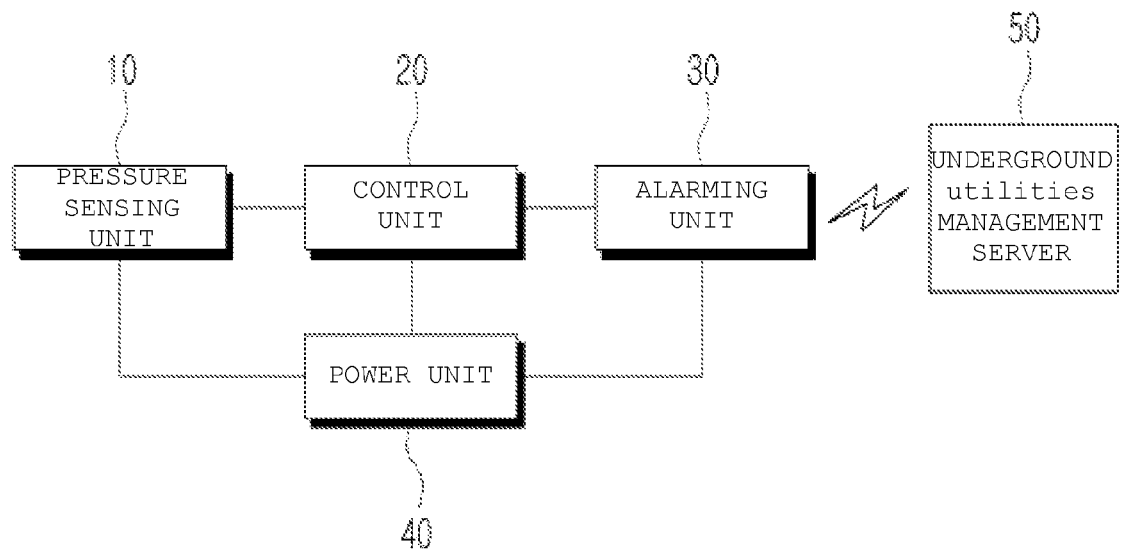
FIG. 3 is a diagram illustrating the configuration of an electrical connection relationship according to a modified exemplary embodiment of the first exemplary embodiment.

FIG. 1 is a perspective view of a system for protecting underground utilities and preventing damages according to a first exemplary embodiment of the present invention and FIG. 2 is a diagram illustrating the configuration of an electrical connection relationship according to the first exemplary embodiment.

As shown in the figures, a system for protecting underground utilities and preventing damages according to the present exemplary embodiment includes a pressure sensing unit (10), a control unit (20), an alarming unit (30), and power unit (40).

The pressure sensing unit (10) is disposed close to underground utilities (100) and senses a pressure change. For this purpose, the present exemplary embodiment selects a configuration in which the pressure sensing unit (10) senses a pressure change due to leakage of a high-pressure gas in a gas pipe (11).

In detail, the pressure sensing unit (10) is composed of the gas pipe (11) that is broken at a pressure over a predetermined level, a gas in the gas pipe (11), and a pressure switch (13) that switches when the pressure of the gas is decreased by breakage of the gas pipe (11).

In this configuration, it is preferable that the gas has a color such that whether the gas is ejected can be checked with naked eyes and it is more preferable that the gas has a predetermined color in accordance with the kind of the underground utilities (100). For example, when the underground utilities (100) is a city gas pipe, the gas is provided with a yellow color such that it can be seen that the underground utilities (100) is a city gas pipe from the color of the gas, when the gas leaks.

Further, it is preferable that the gas pipe (11) is made of a material that can be broken by impact due to the bucket of an excavator, for example, a plastic material. This is because a worker can recognize that there is the underground utilities (100) from the color of the gas or by the alarming unit (30) only when the gas pipe (11) can be broken by impact.

Further, the length of the gas pipe (11) may be selected, in accordance with the use of the underground utilities (100) and the circumstances.

On the other hand, the control unit (20) is connected to the pressure sensing unit (10) and generates an alarming instruction, when the pressure change sensed by the pressure sensing unit (10) is above a predetermined level. The control unit (20) is connected to a pressure switch (13) of the pressure sensing unit (10) in the present exemplary embodiment. Therefore, when a high-pressure gas leaks due to breakage of the gas pipe (11), the pressure in the gas pipe (11) rapidly decreases, such that the pressure switch (13) operates and the control unit (20) generates an alarming instruction under the determination that the pressure change is above a predetermined level, and transmits the alarming instruction to the alarming unit (30).

The alarming unit (30) is connected to the control unit (20) and exposed on the ground, and generates an alarming signal in accordance with the alarming instruction from the control unit (20). The generated alarming signal may be light or an alarm that shows a predetermined color.

The alarming unit (30) may be equipped with a radio transmitter (not shown) to be able to wirelessly transmit the alarming signal to an underground utilities management server (50). When sending an alarming signal to the underground utilities management server (50), it is preferable to give an identical number, which is designated to correspond to the location of the alarming unit (30) and the kind of the underground utilities (100), to the alarming signal and then transmit the alarming signal.

The power unit (40) functions to supply power to the pressure sensing unit (10), the control unit (20), and the alarming unit (30). The power unit (40) may be implemented by various power suppliers. For example, a battery, a mercury battery, and a lithium battery may be used. However, it is exemplified in the present exemplary embodiment to use a solar cell (41) that generates electricity from the sunlight in order to remove the inconvenience of periodically supplying power to the power unit (40) and to stably supply power to the power unit (40). An individual battery may be additionally provided to assist the solar cell (41) for power supply.

The solar cell (41) is configured with the alarming unit (30) exposed on the ground and equipped with a capacitor (not shown) that accumulates electricity generated by the solar cell (41).

Next, the operation of the system for protecting underground utilities and preventing damages according to the present exemplary embodiment is described.

Since the solar cell (41) is exposed on the ground, it collects the sunlight, generates electricity, and stores the electricity in the capacitor in the daytime. The power unit (40) supplies power to the pressure sensing unit (10), the control unit (20), and the alarming unit (30), using the electricity described above.

The gas pipe (11) of the pressure sensing unit (10) is filled with a high-pressure gas. Therefore, when the bucket of an excavator applies impact to the gas pipe (11) during excavation, the gas pipe (11) is broken and the gas in the gas pipe (11) is ejected. The gas is provided with a predetermined color such that it is possible to see whether the gas is ejected and to know the kind of the underground utilities (100). Therefore, the worker can know that there is the underground utilities (100) at a close position and the kind of the underground utilities (100), by checking the ejected gas.

Further, the pressure switch (13) is connected to the gas pipe (11) and the pressure switch (13) switches in accordance with a change in pressure. Therefore, when the pressure in the gas pipe (11) rapidly decreases while the high-pressure gas leaks due to breakage of the gas pipe (11), the pressure switch (13) switches.

A switching signal of the pressure switch (13) is transmitted to the control unit (20) and the control unit generates an alarming signal under the determination that the pressure change is above a predetermined level from the switching signal, and transmits the alarming signal to the alarming unit (30).

The alarming unit (30) informs the worker that the present working position is close to the underground utilities (100), by generating light that shows a predetermined color or a sound in accordance with the alarming signal. Further, the alarming unit (30) can transmit an alarming signal to the underground utilities management server (50), such that it is possible to integrally and immediately manage the underground utilities (100).

Further, even if the alarming unit (30) fails to normally operate, the underground utilities can be protected, because the gas having a color, which can be seen to the naked eyes through the pressure sensing unit (10), is ejected.

On the contrary, when the gas leaks without external impact sensed by the pressure sensing unit (10), the alarming unit (30) sounds the alarm in response to pressure reduction due to leakage of the gas, such that the pressure sensing unit (10) can keep the normal operation state. Therefore, in the present invention, as the pressure sensing unit (10) and the alarming unit (30) operate to complement each other, the system according to the present invention can stably operate.

Second Exemplary Embodiment

Next, a second exemplary embodiment of the system for protecting underground utilities and preventing damages according to the present invention is described. The same reference numerals are given to the components corresponding to those of the first exemplary embodiment in the present exemplary embodiment.

Figure 4:
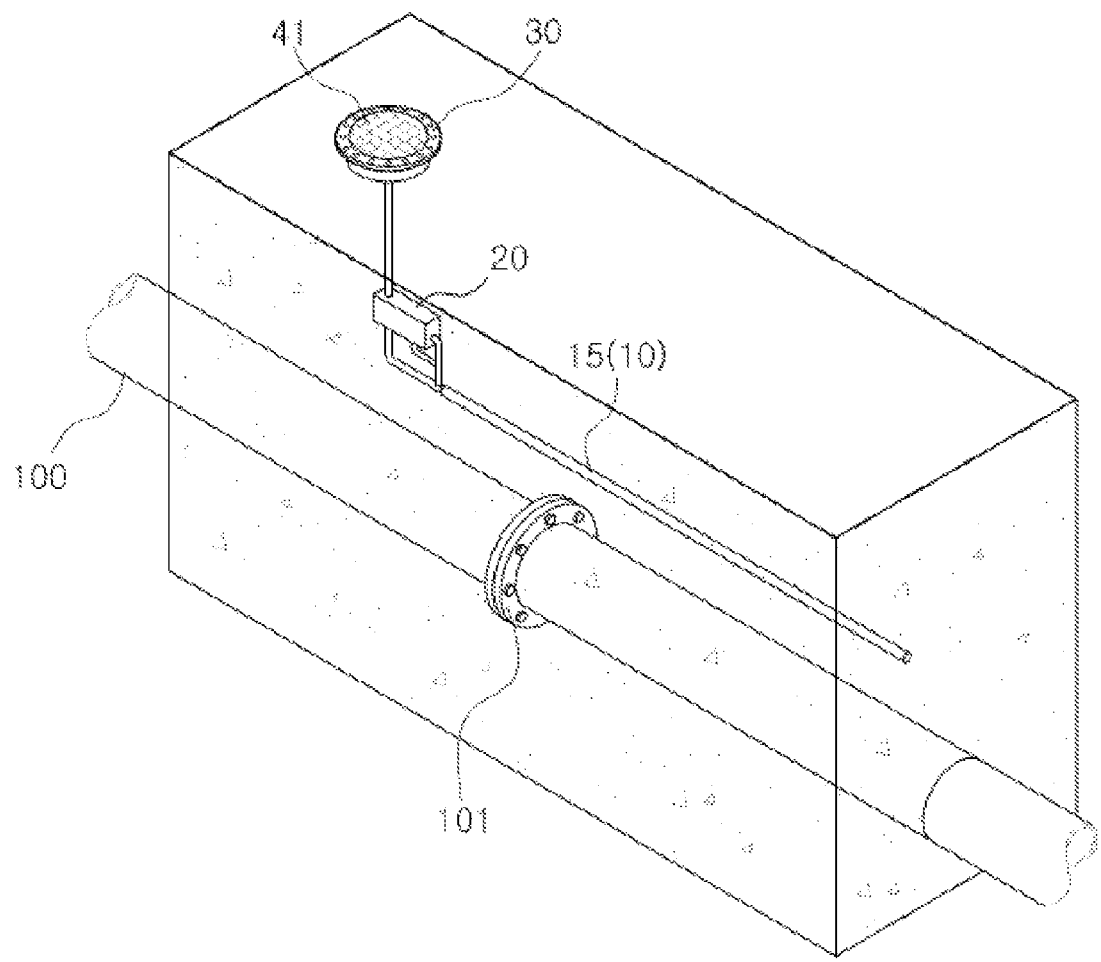
FIG. 4 is a perspective view showing the configuration of a system for protecting underground utilities and preventing damages according to a second exemplary embodiment of the present invention.
Figure 5:
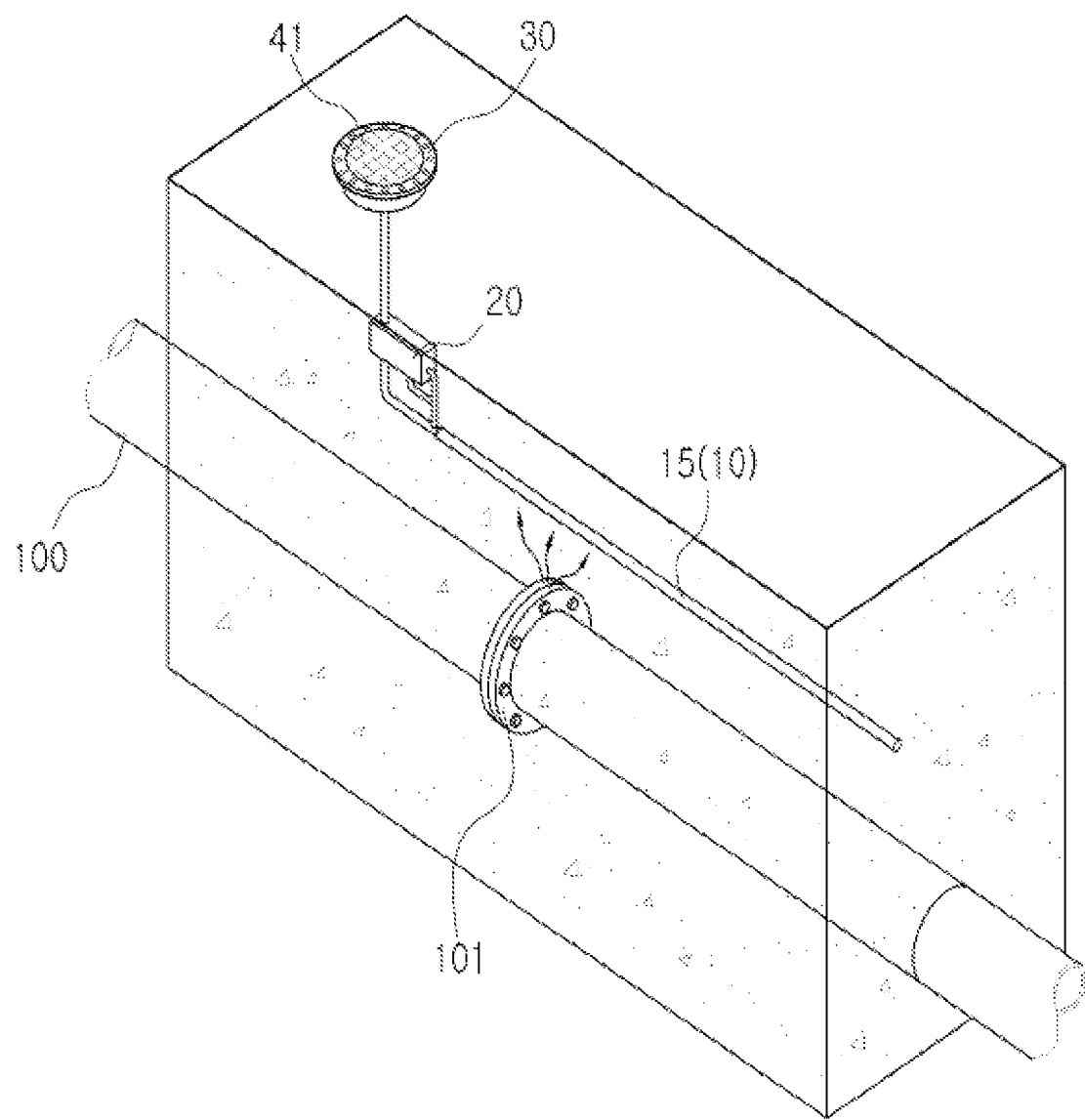
FIG. 5 is a perspective view illustrating a method of sensing fluid leakage from underground utilities.

FIG. 4 is a perspective view showing the configuration of a system for protecting underground utilities and preventing damages according to a second exemplary embodiment of the present invention and FIG. 5 is a perspective view illustrating a method of sensing fluid leakage from underground utilities.

As shown in the figures, the configuration of a pressure sensing unit (10) in the present exemplary embodiment is different from that in the first exemplary embodiment. That is, the pressure sensing unit (10) is implemented by a piezoelectric cable sensor (15) or a piezosensor (not shown) that generates an electric signal in accordance with a change in pressure. Further, the present exemplary embodiment exemplifies the piezoelectric cable sensor (15) for the pressure sensing unit (10).

The piezoelectric cable sensor (15) generates an electric signal from pressure due to impact applied by the bucket of an excavator and transmits the electric signal to a control unit (20) and the control unit determines whether the electric signal corresponds to pressure above a predetermined level.

Further, the piezoelectric cable sensor (15) according to the present exemplary embodiment can sense the pressure of fluid that leaks from the underground utilities (100). That is, when the underground utilities (100) is a pipe through which fluid flows, the fluid may leak from the underground utilities, particularly, a joint (101) between the underground utilities, due to decrepitude or corrosion of the underground utilities (100) or excessive pressure of the fluid that flow through the underground utilities (100). The leaking fluid is ejected at high pressure, such that the fluid presses the piezoelectric cable sensor (15) disposed close to the underground utilities (100) is pressed and the piezoelectric cable sensor (15) generates an electric signal from the pressing force. Therefore, according to the present exemplary embodiment, it is possible to check and take measures against leakage of fluid from the underground utilities, not only when impact due to excavation is applied, but when there is not external impact.

The present invention is not limited to the exemplary embodiments described above and defined by claims, and it is apparent to those skilled in the art that the present invention may be modified in various ways without departing from the scope of the present invention described in claims.

What is claimed is:

1. A system for protecting underground utilities and preventing damages, the system comprising:
- a gas pipe that is installed close to underground utilities, the gas pipe being disposed at a predetermined distance above the underground utilities without being connected to the underground utilities, the gas pipe being filled with a gas;
- a pressure switch that switches when the pressure of the gas is decreased by breakage of the gas pipe;
- a control unit that is connected to the pressure switch and generates an alarming instruction, when the pressure switch switches;
- an alarming unit that is connected to the control unit, is exposed on the ground, and generates an alarming signal in accordance with the alarming instruction from the control unit; and
- a power unit that supplies power to the pressure switch, the control unit, and the alarming unit.

2. The system of claim 1, wherein the gas has a color such that whether the gas is ejected is seen to naked eyes.

3. The system of claim 1, wherein the alarming unit generates an alarming signal, using light or sound.

4. The system of claim 1, wherein the alarming unit wirelessly transmits an alarming signal to an underground utilities management server.

5. The system of claim 1, wherein the power unit includes a solar cell that is disposed to be exposed on the ground together with the alarming unit, and a capacitor that accumulate electricity generated by the solar cell.

6. The system of claim 1, wherein the gas pipe is configured to be broken by an impact by a bucket of an excavator.

7. The system of claim 1, wherein the gas pipe is a closed pipe and, unless the gas pipe is broken, the gas stays in the gas pipe without generating any flow.

8. The system of claim 1, wherein the underground utilities have a shape of pipe, and the gas pipe is disposed along the pipe-shaped underground utilities such that the gas pipe is spaced apart by the predetermined distance from the pipe-shaped underground utilities.

* * * * *